(12) United States Patent
Rajendran et al.

(10) Patent No.: US 9,817,980 B2
(45) Date of Patent: Nov. 14, 2017

(54) SYSTEM, METHOD AND COMPUTER-ACCESSIBLE MEDIUM FOR FACILITATING LOGIC ENCRYPTION

(71) Applicant: New York University, New York, NY (US)

(72) Inventors: Jeyavijayan Rajendran, Brooklyn, NY (US); Youngok Pino, Rome, NY (US); Ozgur Sinanoglu, Abu Dhabi (AE); Ramesh Karri, New York, NY (US)

(73) Assignee: New York University, New York, NY (US)

( * ) Notice: Subject to any disclaimer, the term of this patent is extended or adjusted under 35 U.S.C. 154(b) by 80 days.

(21) Appl. No.: 14/775,138

(22) PCT Filed: Mar. 14, 2014

(86) PCT No.: PCT/US2014/028926
§ 371 (c)(1),
(2) Date: Sep. 11, 2015

(87) PCT Pub. No.: WO2014/153067
PCT Pub. Date: Sep. 25, 2014

(65) Prior Publication Data
US 2016/0034694 A1 Feb. 4, 2016

Related U.S. Application Data

(60) Provisional application No. 61/782,606, filed on Mar. 14, 2013.

(51) Int. Cl.
*G06F 21/00* (2013.01)
*G06F 21/60* (2013.01)
(Continued)

(52) U.S. Cl.
CPC ........ *G06F 21/602* (2013.01); *G06F 17/5045* (2013.01); *G06F 21/72* (2013.01);
(Continued)

(58) Field of Classification Search
CPC ....................................................... G06F 21/31
See application file for complete search history.

(56) References Cited

U.S. PATENT DOCUMENTS 4,875,209 A * 10/1989 Mathewes, Jr. .................. G01B 31/318566
714/703
5,781,585 A * 7/1998 Dorner ................ H04L 12/2602
327/64

(Continued)

FOREIGN PATENT DOCUMENTS

WO    WO 2011-047062    4/2011

OTHER PUBLICATIONS

International Serach Report for International Application No. PCT/US2014/028926 dated Aug. 8, 2014.
Written Opinion for International Application No. PCT/US2014/028926 dated Aug. 8, 2014.
Rajendran et al. "Security Analysis of Logic Obfuscation," (2012).
Koushanfar et al., "Provably Secure Active IC Metering Techniques for Piracy Avoidance and Digital Rights movement", IEEE, vol. 7, No. 1 Feb. 1, 2012, pp. 51-63.
(Continued)

*Primary Examiner* — Morshed Mehedi
(74) *Attorney, Agent, or Firm* — Andrews Kurth Kenyon LLP

(57) ABSTRACT

Exemplary systems, methods and computer-accessible mediums for encrypting at least one integrated circuit (IC) can include determining, using an interference graph, at least one location for a proposed insertion of at least one gate in or at the at least one IC, and inserting the gate(s) into the IC(s) at the location(s). The interference graph can be constructed based at least in part on an effect of the location(s) on at least one further location of the IC(s).

14 Claims, 16 Drawing Sheets

(51) Int. Cl.
  *G06F 21/72*   (2013.01)
  *G09C 1/00*    (2006.01)
  *H04L 9/00*    (2006.01)
  *G06F 17/50*   (2006.01)

(52) U.S. Cl.
  CPC .............. *G09C 1/00* (2013.01); *H04L 9/002*
      (2013.01); *G06F 2217/66* (2013.01); *G06F*
      *2221/2111* (2013.01); *H04L 2209/04* (2013.01)

(56) References Cited

U.S. PATENT DOCUMENTS

| | | | | |
|---|---|---|---|---|
| 8,427,203 | B2* | 4/2013 | Pino | H03K 19/173 |
| | | | | 326/101 |
| 8,522,052 | B1* | 8/2013 | Lesea | H04L 9/003 |
| | | | | 713/194 |
| 2008/0301594 | A1* | 12/2008 | Jiang | G06F 17/5031 |
| | | | | 716/134 |
| 2010/0318945 | A1* | 12/2010 | Koushanfar | G06F 21/75 |
| | | | | 716/104 |
| 2011/0113392 | A1* | 5/2011 | Chakraborty | G06F 17/505 |
| | | | | 716/102 |
| 2014/0375353 | A1* | 12/2014 | Sinanoglu | G06F 17/505 |
| | | | | 326/8 |

OTHER PUBLICATIONS

Desai et al., "Interlocking Obfuscation for Anti-tamper Hardware", DOI; Jan. 8, 2013, pp. 1-4.
Extended European Search Report dated Oct. 13, 2016 for EP 14768459.1.
J. Roy, F. Koushanfar , and I. Markov, "EPIC: Ending Piracy of Integrated Circuits," 5 Proc. of Design, Automation and Test in Europe, pp. 1069-1074, 2008.
"Defense Science Board (DSB) study on High Performance Microchip Supply," http://www.acg.osd.mil/dsb/reports/ADA435563.pdf, 2005.
R. Karri et al., "Trustworthy Hardware: Identifying and Classifying Hardware Trojans," IEEE Computer, vol. 43, No. 10, pp. 39-46, 2010.
SEMI, "Innovation is at risk as semiconductor equipment and materials industry loses up to $4 billion annually due to IP infringement," www.semi.org/en/Press/P043775, 2008.
R. Chakraborty and S. Bhunia, "HARPOON: An Obfuscation-Based SoC Design . . . Hardware Protection," IEEE Transactions on Computer-Aided Design, vol. 28, No. 10, pp. 1493-1502,2009.
A. Baumgarten, A. Tyagi, and J. Zambreno, "Preventing IC Piracy Using Reconfigurable Logic Barriers," IEEE Design and Test of Computers, vol. 27, No. 1 pp. 66-75, 2010.

* cited by examiner

SYSTEM, METHOD AND COMPUTER-ACCESSIBLE MEDIUM FOR FACILITATING LOGIC ENCRYPTION

CROSS-REFERENCE TO RELATED APPLICATIONS

This application relates to and claims the benefit and priority from International Patent Application No. PCT/US2014/028926 filed on Mar. 14, 2014, which claims the benefit and priority from U.S. Provisional Application No. 61/782,606 filed on Mar. 14, 2013, the entire disclosures of which is are incorporated herein by reference.

STATEMENT REGARDING FEDERALLY SPONSORED RESEARCH

This invention was made with government support under Grant No. FA8750-11-2-0274, awarded by the United States Air Force. The government has certain rights in the invention.

FIELD OF THE DISCLOSURE

The present disclosure relates generally to the securing of integrated circuits ("IC"), and more specifically, to exemplary embodiments of systems, methods and computer-accessible mediums for securing ICs through an exponential obfuscation.

BACKGROUND INFORMATION

Globalization of Integrated Circuit design is making IC/Intellectual Property ("IP") designers and users reevaluate their trust in hardware. (See, e.g., Reference 2). As the IC design flow can be distributed worldwide, hardware can be prone to new kinds of attacks such as reverse engineering and IP piracy. (See, e.g., Reference 1). An attacker, anywhere in the design flow, can reverse engineer the functionality of an IC/IP. The attacker can then steal and claim ownership of the IP. An untrusted IC foundry can overbuild ICs and sell them illegally. Finally, rogue elements in the foundry can insert malicious circuits (e.g., hardware trojans) into the design without the designer's knowledge. (See, e.g., Reference 3). Because of these attacks, the semiconductor industry loses approximately $4 billion annually. (See, e.g., Reference 4).

If a designer can hide the functionality of an IC while it passes through the different, potentially untrustworthy, phases of the design flow, these attacks can be thwarted. (See, e.g., Reference 1). Logic obfuscation can hide the functionality and the implementation of a design by inserting additional gates into the original design. In order for the design to exhibit its correct functionality (e.g., produce correct outputs), a valid key has to be supplied to the obfuscated design. The gates inserted for obfuscation can be the key-gates. Upon applying a wrong key, the obfuscated design can exhibit an incorrect functionality (e.g., produce wrong outputs).

For example, FIG. 1 illustrates an exemplary circuit obfuscated using two key-gates K1 and K2. The inputs I1-I6 can be the functional inputs and KI and K2 can be the key inputs connected to the key-gates. On applying the correct key values (K1=0 and K2=1) the design can produce a correct output; otherwise, it can produce a wrong output. Logic obfuscation can be incorporated into the IC design flow, as shown in FIG. 2. (e.g., See, e.g., Reference 1). In the untrusted design phases, the IC can be obfuscated, and its functionality may not be revealed. Post fabrication, the IP vendor can activate the obfuscated design by applying the valid key. The keys can be stored in a tamper-evident memory inside the design to prevent access to an attacker, rendering the key inputs inaccessible by an attacker.

Logic obfuscation can be defeated if an attacker can determine the secret keys used for the obfuscation. By determining the keys, the attacker can decipher the functional netlist, and make pirated copies of the ICs and sell them illegally. An attacker can apply specific input patterns, observe the outputs for these patterns, and decipher the secret key. To perform this attack, as shown in FIG. 2, the attacker can utilize the obfuscated netlist and a functional IC. An attacker can obtain the obfuscated netlist (205) from the IC design, or by reverse engineering the layout (210), the mask (215), or a manufactured IC (220). The functional IC (225) can then be bought in the open market.

The value of an unknown key can be determined if it can be sensitized to an output without being masked/corrupted by the other key-bits and inputs. By observing the output, the sensitized key bit can be determined, given other key-bits that are X-sources (e.g., those similar to unknown X-sources). Uninitialized memory units, bus contentions, or multi-cycle paths can be the source of unknown response bits (e.g., unknown-Xs in testing) and can be lion-controllable.

Once an attacker can determine an input pattern that can propagate the key-bit value to an output without any interference, it can be applied to the functional IC (e.g., the IC with the correct keys). This pattern can propagate the correct key value to an output. An attacker can observe this output and resolve the value of that key-bit.

For example, as shown in FIG. 1, the key input KI can be sensitized to output 01 if the value at the other input of gate G6 can be 0 (e.g., non-controlling value for an OR gate). This can be achieved by setting I1=1, I2=0 and I3=0. As the attacker can have access to the functional IC, the attacker can apply this pattern and determine the value of K1 on O1. For example, if the value of O1 can be 0 for that input pattern, then K1=0, otherwise K1=1.

This problem can be analogous to the fault sensitization problem in the presence of unknown-X values that can block/mask the fault propagation. (See, e.g., Reference 5). The key-bits KI and K2 can be equivalent to X-sources X1 and X2 in FIG. 1. Both fault detection and key-propagation can utilize an input pattern that sensitizes the fault effect/key bit by blocking the effect of some or all of the X-sources/other key bits, and preventing their interference; justifying the side input of all the gates on the sensitization path to non-controlling values of the gates. However, the two can differ slightly in that fault detection can also involve fault activation by justifying the fault site to the faulty value, while key propagation can utilize only sensitization. Fault detection can aim at blocking/avoiding unknown X's, while key propagation can aim to identify unknowns one at a time resulting in an iterative and dynamic process.

FIG. 3 illustrates an exemplary circuit diagram illustrating how an attacker cannot propagate the effect of key bits individually to the outputs of an integrated circuit, which can be the same functional circuit shown in FIG. 1. However, as shown in FIG. 3, key-gates K1 and K2 can be at different locations. Here, if the attacker has to propagate the effect of either of the keys, then the attacker has to force a '01 (e.g., non-controlling value of NOR gates) on the other input of G4. In order to force this value, the attacker has to control the key inputs, which can be inaccessible. Thus the attacker cannot propagate the effect of a key to an output, failing to determine the values of the key.

To prevent attacks on ICs, key-sensitization can be hampered by inserting key-gates in such a way that propagation of a key value can be possible only if certain conditions can be forced on other key inputs. As these key inputs may not be accessible by the attacker, the attacker cannot force the values that can be needed to propagate the effect of a key. Thus, brute force has to be employed.

Logic obfuscation techniques can be broadly classified into two types-sequential and combinational. In sequential logic obfuscation, additional logic (e.g., black) states can be introduced in the state transition graph. (See, e.g., Reference 7).

For example, a state transition graph can be modified in such a way that the design reaches a valid state only on applying a correct sequence of key bits. If the key can be withdrawn, the design, once again, ends up in a black state. In combinational logic obfuscation, XOR/XNOR gates can be introduced to conceal the functionality of a design. (See, e.g., Reference 1). Obfuscation can also be performed by inserting memory elements. (See, e.g., Reference 8). The circuit can function correctly only when these elements can be programmed correctly. However, using memory elements can incur significant performance overhead.

Thus, it may be beneficial to provide a strong defensive scheme and/or system that can utilize smart logic obfuscation, and which can overcome at least some of the problems described herein above.

SUMMARY OF EXEMPLARY EMBODIMENTS

These and other objects of the present disclosure can be achieved by provision of exemplary systems, methods and computer-accessible mediums for encrypting an IC which can include determining, using an interference graph, a location to insert a gate(s) in the IC(s), and inserting the gate(s) into the IC(s) at the location(s). In some exemplary embodiments, the interference graph can be constructed based at least in part on an effect of the location(s) on a further location(s). In certain exemplary embodiments, a graph node related to the at least one location and at least one graph edge related to a degree of erasability of an effect of the at least one location on the at least one further location can be generated.

In some exemplary embodiments of the present disclosure, a first weight can be assigned to a non-mutable edge(s) and a second weight can be assigned to a mutable edge(s). The first weight can be higher than the second weight. A key-gate(s) can be selected based on the gate that maximizes a sum of weights of the graph edge(s). The interference graph can be updated graph based on the key-gate(s). The key-gate(s) can be an XOR gate or an XNOR gate.

According to further exemplary embodiments of the present disclosure, the determination procedure can include performing a clique analysis on the interference graph to determine the at least one location, and cliques of the clique analysis can be sufficiently large to enhance the encryption of the circuit. The gate(s) can include a multiplexer, an XOR gate, or an XNOR gate. In some exemplary embodiments, the gate(s) can be configured to corrupt functionality of the IC based on an incorrect key.

In yet a further exemplary embodiment of the present disclosure, it is possible to provide an IC that can have a gate(s) that can have a location determined based on an interference graph.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features, and advantages of the present disclosure will become apparent from the following detailed description taken in conjunction with the accompanying Figures showing illustrative embodiments of the present disclosure, in which.

Figure 1:
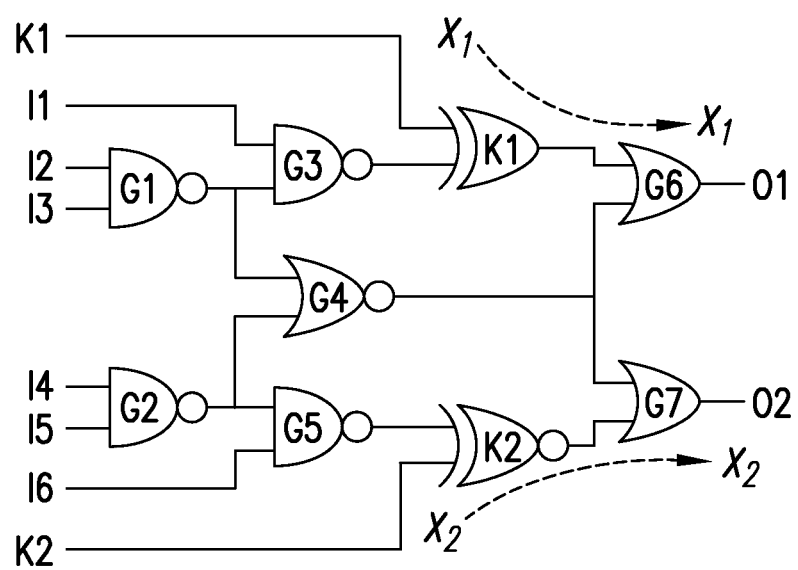
FIG. 1 is an exemplary circuit diagram illustrating obfuscation using two key-gates.
Figure 2:
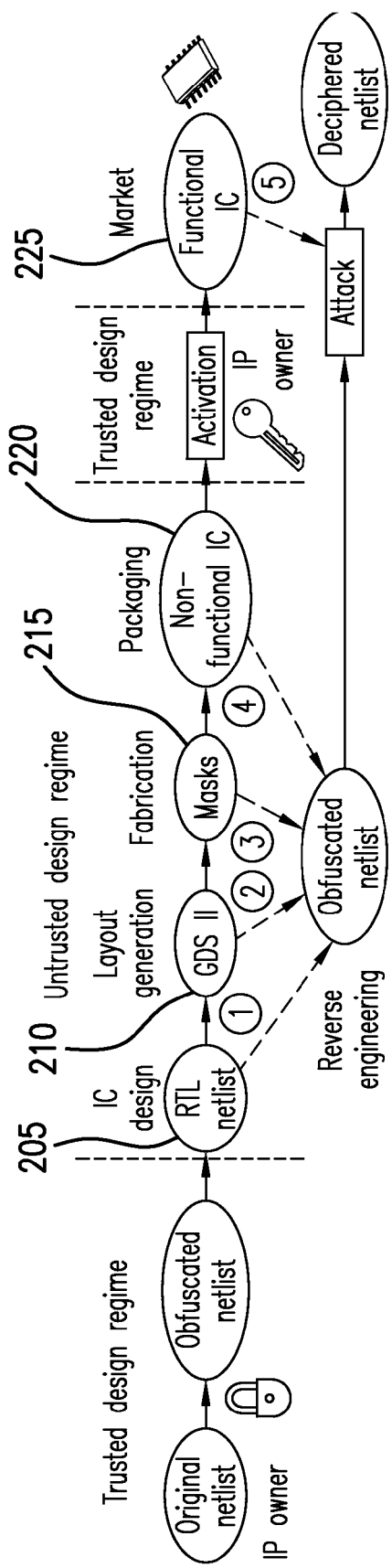
FIG. 2 is an exemplary IC obfuscated design flow diagram.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and provided in the appended claims.

DETAILED DESCRIPTION

A logic obfuscation technique can insert key-gates anywhere in a circuit. Depending upon their location, the attacker can develop different strategies to determine the key bits. Depending on the strategy employed by an attacker, key-gates can be classified based on their type of interference with other key-gates.

Figure 3:
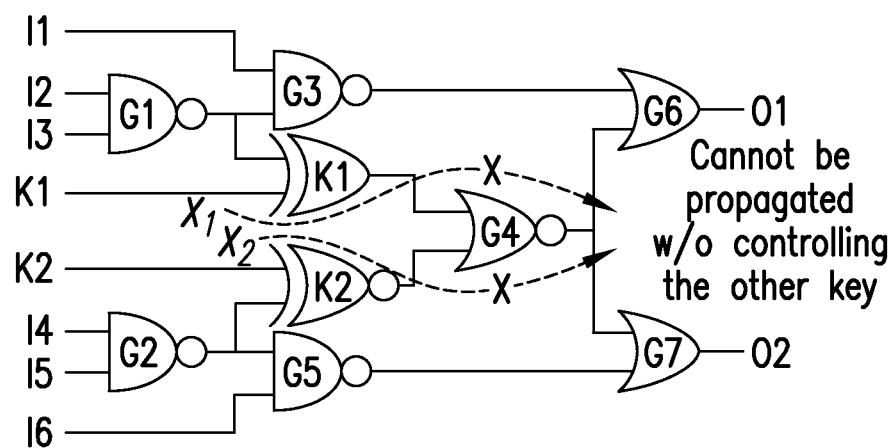
FIG. 3 is an exemplary circuit diagram illustrating how an attacker cannot propagate the effect of key bits individually to the outputs of an IC according to exemplary embodiments of the present disclosure.

FIG. 3 illustrates an exemplary circuit diagram illustrating how an attacker cannot propagate the effect of key bits individually to the outputs of an integrated circuit, which can be the same functional circuit shown in FIG. 1. As shown in FIG. 3, key-gates K1 and K2 can be at different locations. Here, if the attacker has to propagate the effect of either of the keys, then the attacker has to force a 'O1 (e.g., non-controlling value of NOR gates) on the other input of G4. In order to force this value, the attacker has to control the key inputs, which can be inaccessible. Thus the attacker may not be able to propagate the effect of a key to an output, failing to determine the values of the key.

To prevent attacks on ICs, according to an exemplary embodiment of the present disclosure, a key-sensitization can be hampered by inserting key-gates in such a way that propagation of a key value can be possible only if certain conditions can be forced on other key inputs. As these key inputs may not be accessible by the attacker, the attacker may not be able to force the values that can be needed to, propagate the effect of a key. Thus, a brute force may need to be employed by the attacker.

Figure 4A:
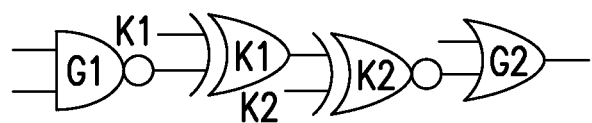
FIGS. 4A and 4B are exemplary circuit diagrams of exemplary runs of two key-gates according to exemplary embodiments of the present disclosure.

FIG. 4A illustrates an exemplary circuit diagram showing exemplary runs of two-key gates, K1 and K2, which can form a run as they are connected back-to-back, according to exemplary embodiments of the present disclosure. Runs of key-gates can reduce the effort needed by an attacker as they can increase the valid key space. If N key-gates form a run, then the valid key space can increase from the ideal, 1 valid key, to 2N−1 valid keys. In the above example, 01 and 10 can be valid keys, one of which is sufficient for the attacker.

Figure 4B:
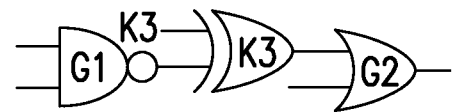

An attacker can replace a run of key gates by a single key-gate, thereby reducing the number of key bits. When the value of that key-gate can be determined, the attacker can find the entire valid key space. For example, as shown in FIG. 4B, the attacker can replace KI and K2 with a key-gate K3. After the value of K3 is resolved as 1, e.g., the attacker can determine that the valid key space can be 01 and 10.

If there can be no path from a key-gate to all the other key gates and vice-versa, then such a gate can be called an isolated key-gate. For example, FIG. 1 illustrates that there can be no path between K1 and K2 as such, K1 and K2 are isolated gates. An attacker can prefer isolated key-gates as there can be no interference with other key-gates. An attacker can identify a pattern that uniquely propagates the effect of an isolated key-gate's key to an output. The attacker can then apply the pattern to the functional IC and determine its value. For example, the pattern 100XXX can propagate the value of K1 to output O1. An attacker, upon observing this output, can identify that the value of K1 can be 0.

Figure 5:
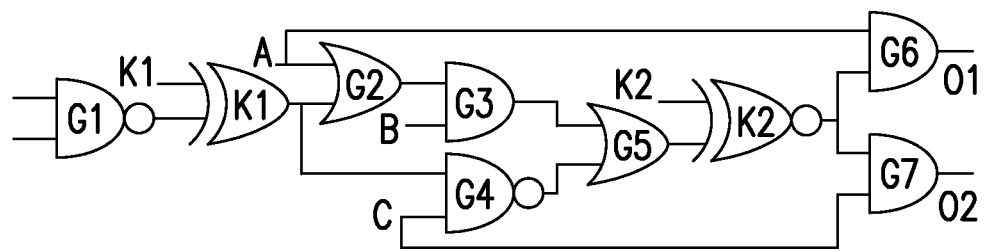
FIG. 5 is an exemplary circuit diagram illustrating a dominating key-gate according to exemplary embodiments of the present disclosure.

If there can be two key-gates K1 and K2 such that K2 lies on every path between K1 and the outputs, then K2 can be called a dominating key-gate (see, e.g., FIG. 5). An attacker can determine the value of K2's key bit only if the effect of K1's key bit can be prevented (e.g., muted) from reaching key-gate K2 while simultaneously sensitizing K2's key bit to an output. An input pattern that can perform muting as well as sensitization can be called the golden pattern. On applying this golden pattern, the attacker can determine the value of K2. If muting of K1 and propagation of K2 cannot be performed simultaneously, then the attacker cannot determine value of K2. In such cases, the golden pattern does not exist, thus likely forcing an attacker to employ brute force.

The effect of a key can be muted before it reaches the other key by using patterns that force controlling values in any of the gates on the path between K1 and K2. If there can be multiple paths from key-gates K1 and K2, then the effect of key-input K1 can be muted on every path.

For example, as shown in the diagram of FIG. 5, K2 can be determined if the effect of K1 can be muted. In FIG. 5, if there can be a pattern that can justify the output of G5 to 1, then the effect of K1 can be muted. Patterns that can make either C=0, or A=1 and B=1, can assure this condition, thereby muting the effect of K1. However, the attacker can select the pattern that can propagate the effect of K2 to an output. If C=0, G7 can block the propagation of K2 as its output can be 0. A=1 can allow K2 to propagate through 06. Therefore, an attacker can select the pattern that makes A=1 and C=0, such that the attacker can mute the effect of KI as well as propagate the effect of K2 to an output.

Figure 6A:
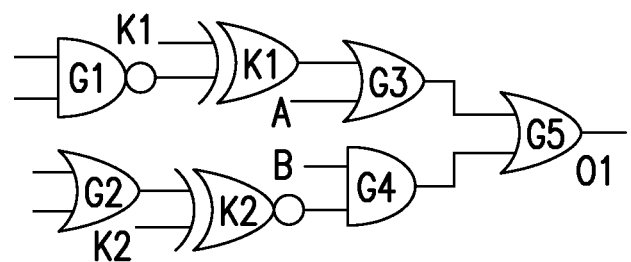
FIGS. 6A and 6B are exemplary circuit diagrams of exemplary key-gates according to exemplary embodiments of the present disclosure.

Even if there are no paths between two key-gates, the sensitization paths can still interfere. Such scenarios can happen if two or more key-gates can converge. Depending upon the type of convergence, key-gates can be classified into (a) concurrently mutable, (b) sequentially mutable, and (c) non mutable key-gates. If two key-gates, K1 and K2, converge at some other gate such that K1's key bit can be determined by muting K2, and K2's key bit can be determined by muting K1, then K1 and K2 are called concurrently mutable key-gates. The key-gates K1 and K2 converge at the gate G5. (See, e.g., FIG. 6A). The value of K1 can be determined by applying a pattern that mutes K2 (e.g., B=0). Similarly, the value of K2 can be determined by applying a pattern that mutes K1 (e.g., A=1). The attacker can determine the golden pattern that mutes one key and simultaneously sensitizes the other key to an output, or vice-versa. If a golden pattern does not exist, then the attacker can perform brute force only on that set of concurrently mutable key-gates.

Figure 6B:
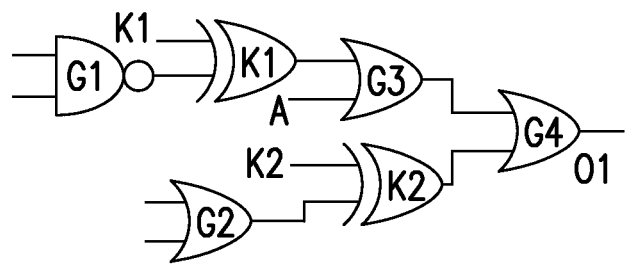

If two gates K1 and K2 converge at some other gate such that K2's key bit can be determined by muting K1's key while K2's key cannot be muted to determine K1's key, then K1 and K2 are called sequentially mutable convergent key-gates, as they can be deciphered only in a particular order. The value of K2 can be determined by applying a pattern that mutes K1 (e.g., A=1), while K2 cannot be muted as it directly feeds the gate where K1 and K2 converge. (See, e.g., FIG. 6B). An attacker can first determine K2's value by muting K1 using the golden pattern. The attacker can then update the netlist by replacing K1 with a buffer or an inverter based on the value of K2. Then K1 can be targeted. If the golden pattern does not exist, then the attacker can have to perform brute force only on that set of sequentially mutable key-gates.

If two key-gates KI and K2 converge at some other gate such that neither of the key bits can be muted, then K1 and K2 are called non-mutable convergent key-gates. For example, the key-gates K1 and K2 can be connected to the same gate G4. (See, e.g. FIG. 3). To propagate either of the key bits, the other key bit can be muted. However, as an attacker cannot access key inputs, the attacker cannot force those values. Hence, the attacker can be forced to perform brute force attacks.

Exemplary Procedure 1 Attack on Logic Obfuscation

---

Input: Obfuscated netlist, Functional IC, Key Inputs
Output: Original netlist;
Determine Runs of Keys;
Replace them with XOR gates;
Update Netlist;
For the remaining keys do
    For each Isolated Key do
        Compute and apply propagation pattern;
        Determine KeyBits and update Netlist
    end
    For each Consecutively or Concurrently or Sequentially Mutable key do
        If there exists a golden pattern then
            Apply the golden pattern;
            Determine KeyBits, Update Netlist, Break;
        else
            ApplyBruteForce( ), Break;
        end
    end
    For each Non-mutable Key do
        ApplyBruteForce( ), Break
    end
end
ApplyBruteForce( );
For each possible key combination do
    Generate random input patterns;
    Simulate the pattern and obtain the outputs $OP_{sim}$;
    Apply the patterns on IC and obtain the output $OP_{exe}$;
    If $OP_{sim} == OP_{exe}$ then
        Valid Key = current key combination;
        Update netlist;
    end
end

---

Exemplary Attacker's Action Plan

By considering the different types of interference between key-gates, an attacker can use Procedure 1 to determine the secret key. The attacker can first remove the runs of key-gates and targets the isolated key-gates. Each isolated gate can be removed by one test pattern. After, the attacker can target consecutively mutable, concurrently mutable, and sequentially mutable key-gates. If the attacker can generate a golden pattern that simultaneously mutes effects of the other keys, and sensitizes the effect of the target key, the value of the target key can be determined. Additionally, the non-mutable keys can be identified via brute force. As the key bits can be identified gradually in the exemplary iteration, the corresponding key-gates can be replaced by a buffer or an inverter, changing the type of the other key-gates. Thus, in the exemplary iteration, the key-gate types can be re-computed.

Exemplary Strong Logic Obfuscation

Strong logic obfuscation can be based on inserting key-gates with complex interferences among them. These types of key-gates can introduce interference using a graph-based notation. To insert key-gates, an interference graph of key-gates can be generated. In this graph, each node can represent a key-gate, and an edge can connect two nodes, if two gates interfere. Isolated key-gates can be represented with isolated nodes. A run of key-gates can be denoted by a single node. Non-mutable key-gates can be connected with non-mutable edges, and concurrently mutable key-gates can be connected with mutable edges. Sequentially mutable key gates can be connected by two edges; a non-mutable edge can arise from the key-gate that can be non-mutable, and mutable edges can arise from the key-gate that can be mutable.

Figure 7A:
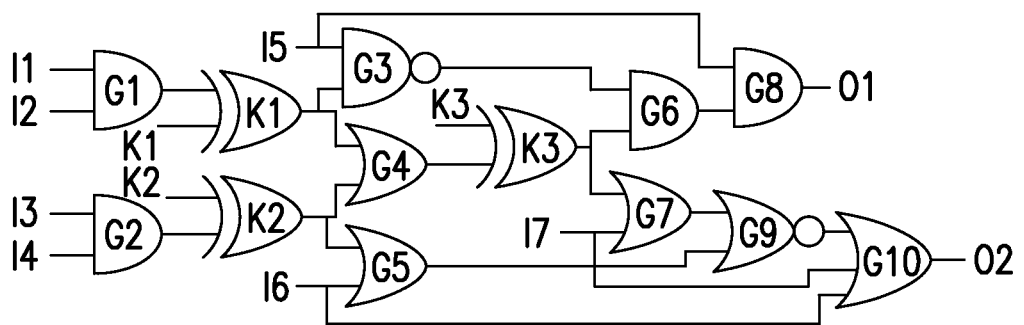
FIG. 7A is an exemplary circuit diagram with three key-gates according to exemplary embodiments of the present disclosure.
Figure 7B:
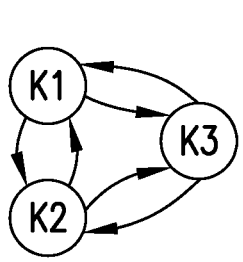
FIGS. 7B-7D are exemplary diagrams of interference graphs according to exemplary embodiments of the present disclosure.

FIG. 7A shows is an exemplary circuit diagram with three key-gates that can interfere with each other, according to an exemplary embodiment of the present disclosure. For example, K1 and K2 can be non-mutable, and therefore they can be connected by non-mutable edges. (See, e.g., FIG. 7B). The key-gates K1 and K3 can converge at the gate G6, and therefore, can be converging key-gates. Specifically, they can be sequentially convergent; K3's effect cannot be muted while K1's effect can be muted by applying I5=0. However if I5 can be 0, then both key bits can be blocked at 08. Thus, K1 and K3 can be non-mutable, and they can be connected by non-mutable edges as shown in FIG. 7B.

K2 and K3 can converge at the gate 09, through G5 and 07, respectively. However, the key bits may not be muted and sensitized individually. For instance, making I6=1 can mute K2, but can also block the sensitization of K3 at G10. Making I7=1 can mute K3, and can also block the sensitization of K2 at G10. Therefore, K2 and K3 can be non-mutable, as shown in the exemplary embodiment of FIG. 7B.

Figure 7C:
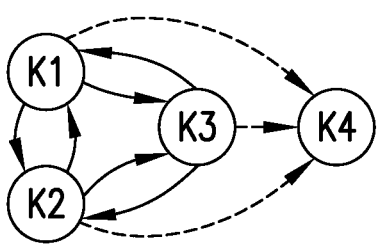

For stronger logic obfuscation, the number of non-mutable edges in the interference graph can be maximized as they can force an attacker to perform brute force. At the same time, if there can be more mutable edges, then the attacker can mute the effect of keys and can easily determine their values. Thus, a defender can prefer non-mutable edges to mutable edges. If a new key-gate, K4, can be inserted at the output of G10, then it can create mutable edges with all the other key-gates. (See, e.g., FIG. 7C). By setting I6=1 or I7=1, the attacker can mute the effects of K1, K2, and K3, and they can be easily deciphered. Therefore, G10 can be connected with mutable edges with the other key-gates as shown in FIG. 7C.

Figure 7D:
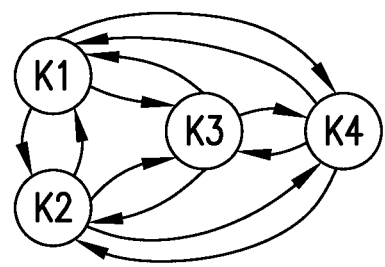

If the new key-gate, K4, can be inserted at the output of G5, then it can create non-mutable edges with the other key-gates as shown in FIG. 7D. Thus, it can be better to insert the new key-gate at the output of G5.

Exemplary Procedure 2 Insertion of Key-Gates

---

Input: Original netlist, KeySize
Output: Obfuscated netlist
KeyGateLocations = { };
Randomly insert 10% key-gates;
Add these locations to KeyGateLocations;
Construct KeyGraph;
For I=2 to KeySize do
    For each $Gate_j$ in Netlist do
        If $Gate_j \notin$ KeyGateLocations then
            Cum. Weight =Σ, weight of edges in KeyGraph;
            For each Key-$Gate_k$ in KeyGateLocations do
                Cum. $Weight_j$ += FindMetric($Gate_j$, Key-$gate_k$);
            end
        end
    end
    Select the Gate with the highest Hardness Metric;
    Add the selected gate to KeyGateLocations;
    Insert a key-gate at the output of the selected gate;
    Update KeyGraph;
end
FindMetric (K1, K2);
if K1 and K2 are isolated then Return 0;
if K1 andK2 are Consecutively Concurrently or Sequentially Mutable then Return 0
    If a golden pattern exists then
    Return weight of mutable edge;
    else Return weight of non-mutable edge;
end
if K1 and K2 are non-mutable then
Return weight of non-mutable edge;

Exemplary Insertion of Key-Gates

A defender can use the interference graph to insert key-gates. (See, e.g., procedure 2). At the exemplary iteration, a key-gate can be inserted at a location such that the number of non-mutable edges in the graph can be maximized. Initially, about 10% of the total key-gates can be inserted at random locations in the circuit. Such random distribution can insert key-gates in different parts of the circuit thereby affecting multiple outputs. About 10% can be considered for the initial distribution, although a different amount of initial distribution can be chosen. After the graph of key-gates can be constructed. Additionally, the remaining key-gates can be introduced iteratively. In exemplary iterations, for each gate in the netlist, the type of edge can be determined with the previously inserted key-gate. Depending upon the type of edge, weights can be assigned, and non-mutable edges can be given a higher weight than the mutable edges. The sum of weights of edges can be calculated in the graph for that gate. The gate that maximizes the sum of weight of edges in the graph can be selected, and a key-gate can be inserted at its output. The graph can be then updated by including the new key-gate. This exemplary procedure can be repeated for inserting all the key-gates.

In exemplary iterations, the defender can check for the presence of golden patterns which can increase the computational complexity of the procedure. Thus, a defender can assume that there always exists a golden pattern and can skip the search for the golden pattern. This can cause a problem for defender because some golden patterns may not exist.

Exemplary Results

The exemplary systems, methods and computer-accessible mediums, according to exemplary embodiments of the present disclosure can be analyzed using, e.g., ISCAS-85 combinational benchmarks. An Atalanta testing tool (see, e.g., Reference 6) can be used to determine the input patterns for muting and propagating the effects of keys. To obfuscate a circuit with a reasonable performance overhead, a key size as 5% of number of gates in that circuit can be selected. While obfuscating a circuit, the defender can assume that there can exist a golden pattern. While attacking the circuit, a search can be conducted for the golden pattern. For every brute force attempt, 1000 random patterns can be applied to determine the value of a key. The area, power, and delay overheads can be obtained using the Cadence RTL compiler.

The effectiveness of four types of insertions can be compared as random-insertion (See, e.g., Reference 1), random insertion with no runs of gates, unweighted insertion where both mutable and non-mutable edges can be given the same weight of 1, and weighted insertion where non-mutable edges can be given a higher weight (e.g., weight=2) than the mutable edges (e.g., weight=1).

Figure 8:
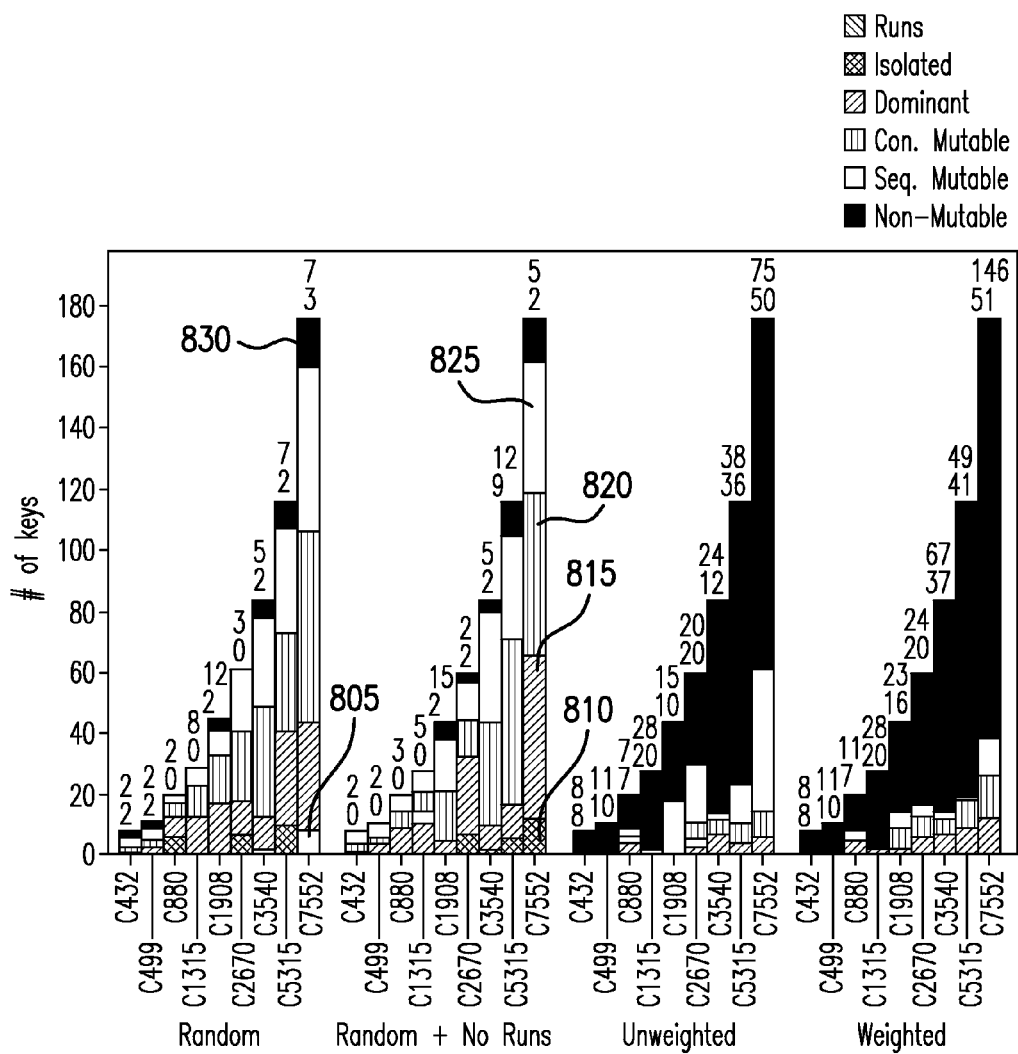
FIG. 8 is an exemplary chart illustrating encryption strength of various types of key-gates according to exemplary embodiments of the present disclosure.

FIG. 8 shows an exemplary chart illustrating various types of key-gates (e.g., Runs 805, Isolated 810, Dominant 815, Consecutively Mutable 820, Sequentially Mutable 825 and Non-Mutable 830) using different benchmarks for different types of insertions according to an exemplary embodiment of the present disclosure. The exemplary systems, methods and computer-accessible mediums, according to exemplary embodiments of the present disclosure, can employ an exemplary random insertion method; most of the keys can be concurrently mutable. Some number of keys can be inserted in runs benefiting the attacker. 30% of keys can be non-mutable and sequentially mutable which can require a brute force approach. In the exemplary "Random+No Runs" procedure, keys may not be inserted in runs, thereby increasing the effort of the attacker.

In the exemplary unweighted and weighted insertions, around 90% of keys can be of non-mutable and sequentially mutable types. Most of the keys in weighted insertion can be either non-mutable or sequentially mutable because they can be given a higher weight. There can be no isolated keys in either of the insertion techniques, as they may not be given any weights.

Due to random insertion of the first 10% of key-gates, multiple disconnected graphs can exist within a key-interference graph. The keys in a graph can either be isolated, dominant, or convergent. Since a defender can assume that the golden patterns always exist, the effective key size from the defender's perspective can be the maximum number of non-mutable keys in a connected key-interference graph. If there can be N non-mutable key gates (e.g., effective key-size), the number of brute force attempts can be $2^{N-1}$. However, when an attacker tries to attack, not all the golden patterns can exist. For those keys, the attacker can attempt all possible combinations. Thus, from an attacker's perspective, the effective key size can be the largest key size on which brute force can be attempted. If the number of brute force attempts can be $2^M$, then the effective key size for an attacker can be M.

As illustrated in the exemplary chart of FIG. 8, the effective key-sizes for a defender and an attacker can be shown as numbers on top of the bars. For both the attacker and defender, the effective key sizes of random insertions can be less than that of the unweighted and weighted insertions. Therefore, the number of brute force attempts needed to decipher the keys inserted using random insertions can be exponentially smaller than that of the unweighted and weighted insertions. The attacker's effective key size can be greater than that of the defender's because of the absence of golden patterns, which can force the attacker to perform brute force. For example, consider the benchmark C7552, the attacker can need $2^{146}$ brute force attempts, and therefore, the effective key size can be 146. On the other hand, for a defender, the largest number of non-mutable key-gates in a connected graph can be 51, and therefore, the effective key size can be 51.

Figure 9:
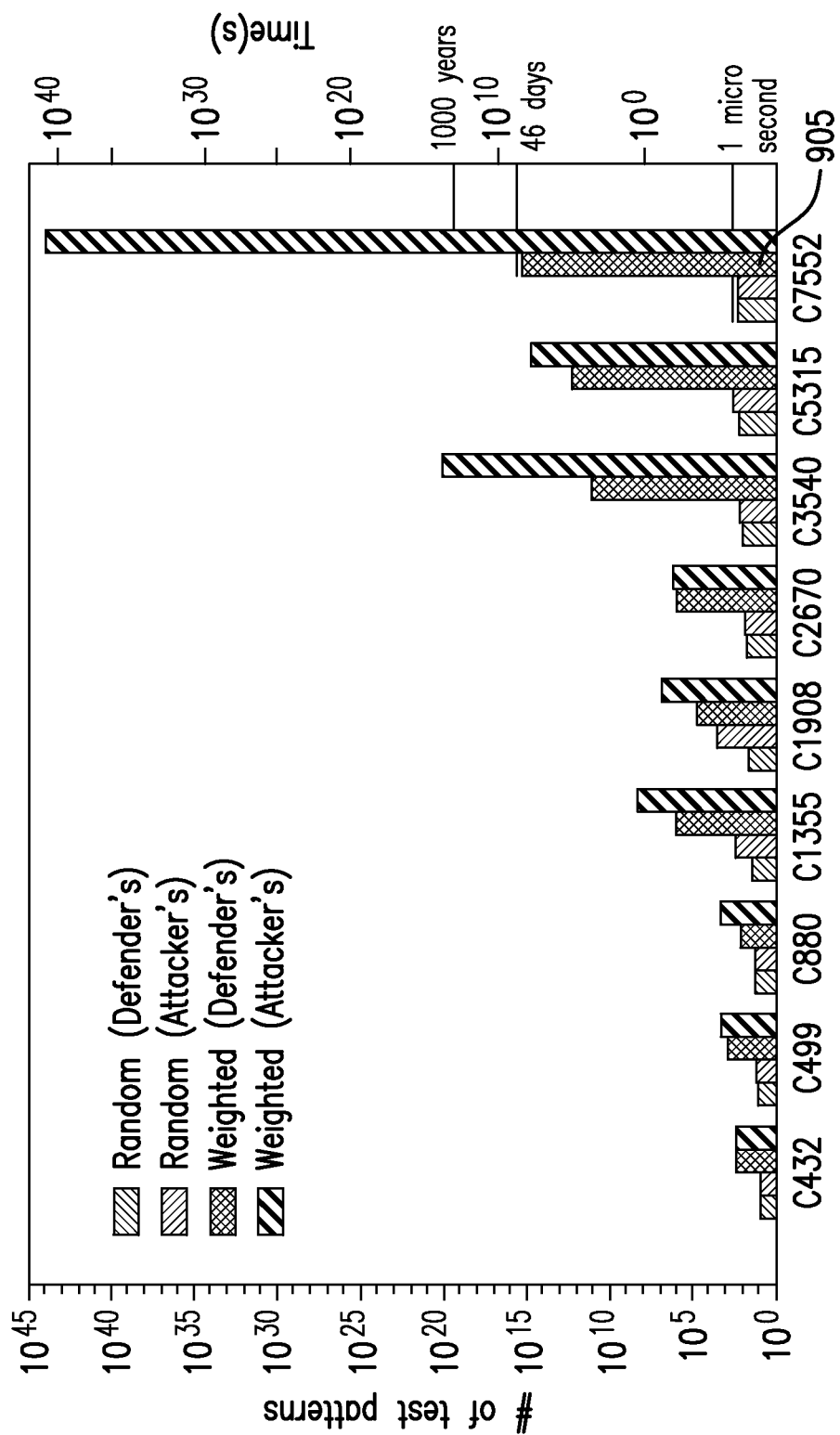
FIG. 9 is an exemplary chart illustrating an exemplary time that an attacker may need to spend in attacking an IC.

FIG. 9 shows an exemplary chart illustrating the time that an attacker can need to determine in attacking an IC using the random and weighted insertion method according to an exemplary embodiment of the present disclosure. The time scales can be calculated assuming that an attacker can apply a billion patterns per second. From a defender's perspective, the number of test patterns can be calculated assuming that golden patterns exist. From an attacker's perspective, the number of test patterns can be more realistic as they can be determined using the exemplary attack methodology described above. It can be seen that the defender's perspective on timescale can be several orders of magnitude smaller than the realistic scenario. For example, in C7552 circuit (905), a defender can think that it can take 46 days to decipher the netlist while the attacker can take more than a thousand years. However, from both the attacker's and defender's perspectives, a few thousand test patterns can be sufficient to figure out the keys when they can be inserted randomly. Alternatively, when the exemplary weighted key insertion procedure can be used, the number of test patterns which can be needed to recover the keys increases by several orders of magnitude. For example, in case of C7552, the number can increase to about $10^{18}$ which can take several years to figure out the key bits.

Exemplary Effect of Weight of on Mutable Edge

TABLE 1

Number of non-mutable keys out of the total 176 keys in the benchmark C7552 for different weights of non-mutable edges.

|  | Weight of non-mutable edge | | | | |
| --- | --- | --- | --- | --- | --- |
|  | 1 | 2 | 10 | 100 | 1000 |
| # of non-mutable key-gates | 115 | 138 | 149 | 156 | 163 |

By increasing the weight of the non-mutable edges, the exemplary systems, methods and computer-accessible mediums, according to exemplary embodiments of the present disclosure, can create a design that has a large number of non-mutable key-gates. Table 1 herein above indicates the number of non-mutable key-gates for different weights of non-mutable edges in one of the ISCAS-85 benchmark circuit, C7552. This circuit can be obfuscated with 176 key-gates. While increasing the weight of the non-mutable edges increases the number of non-mutable key-gates in the design, the rate of increase may not be at the same rate. Increasing the weight from 1 to 2 can increase the number of non-mutable key-gates from 115 to 138. But increasing the weight from 2 to 10 can increase the number of non-mutable key-gates from 138 to 149.

Exemplary Area Overhead

Figure 10:
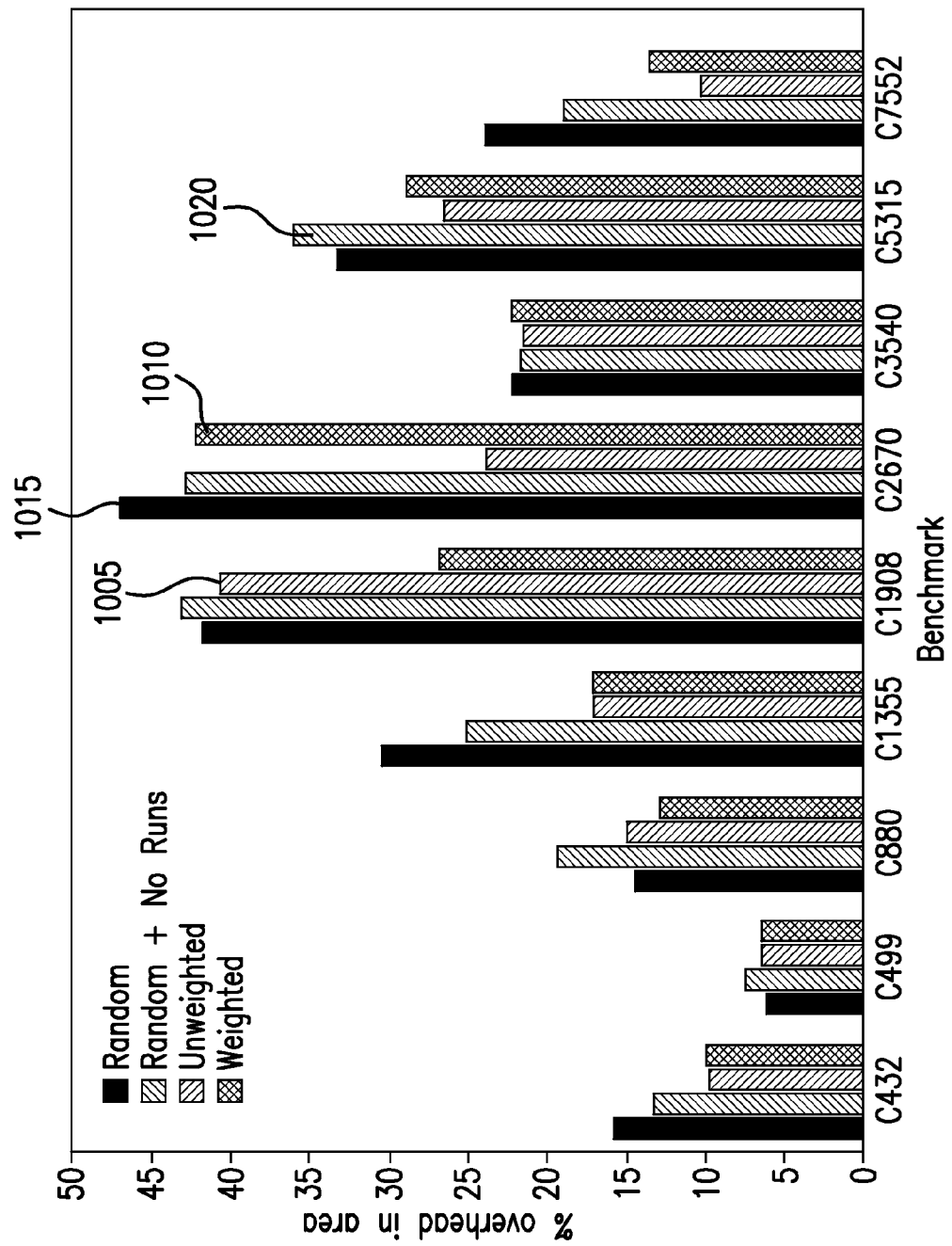
FIG. 10 is an exemplary chart illustrating area overhead for various exemplary insertion procedures according to exemplary embodiments of the present disclosure.

FIG. 10 shows an exemplary chart illustrating area overhead for various exemplary key-gate obfuscation procedures according to an exemplary embodiment of the present disclosure. Even though the number of key gates inserted can be 5% of the number of gates in the original design, the area overhead can be high as the key-gates can be XOR/XNOR gates that can consist of a large number of transistors. Unweighted 1005 and weighted 1010 insertion techniques can entail less overhead than random insertion techniques 1015 and 1020.

Exemplary Power Delay Product

Figure 11:
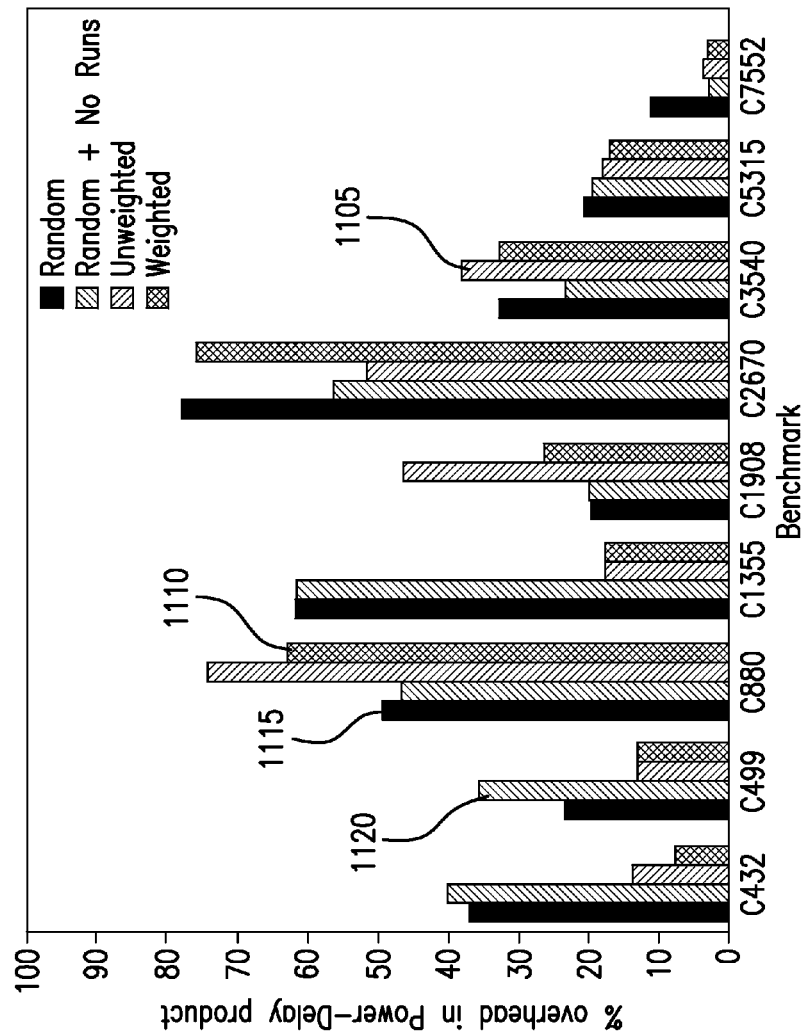
FIG. 11 is an exemplary chart illustrating power delay product overhead for various insertion procedures according to exemplary embodiments of the present disclosure.

FIG. 11 shows an exemplary chart illustrating power delay product overhead for the exemplary system, method, and computer-accessible medium according to an exemplary embodiment of the present disclosure. For example, random insertion 1115 and 1120 can yield an average overhead of 25% while weighted 1110 and unweighted 1105 insertion can yield an average overhead of 21%. To minimize this overhead, one can pursue a power and delay constrained obfuscation.

Exemplary Logic Obfuscation with Physical Unclonable Functions

Physical Unclonable Functions ("PUFs") can be circuits that leverage process variations in IC manufacturing to produce secret keys. PUFs can be used to give unique keys for each IC even though they can all be obfuscated with the same key. (See, e.g., Reference 1). The design can be first obfuscated with a key, and a PUF circuit can be attached to it. Upon applying the user key to the PUF, the PUF's response can be the key used for obfuscation. In the proposed exemplary attack, the attacker can try to determine this response (e.g., the key used for obfuscation). On getting this response, the attacker can remove the PUF circuit from the netlist and apply the correct keys directly to the original design. To break the influence of PUFs, or any cryptographic procedures, an attacker can determine the wires that carry these signals and disconnect them.

Figure 12A:
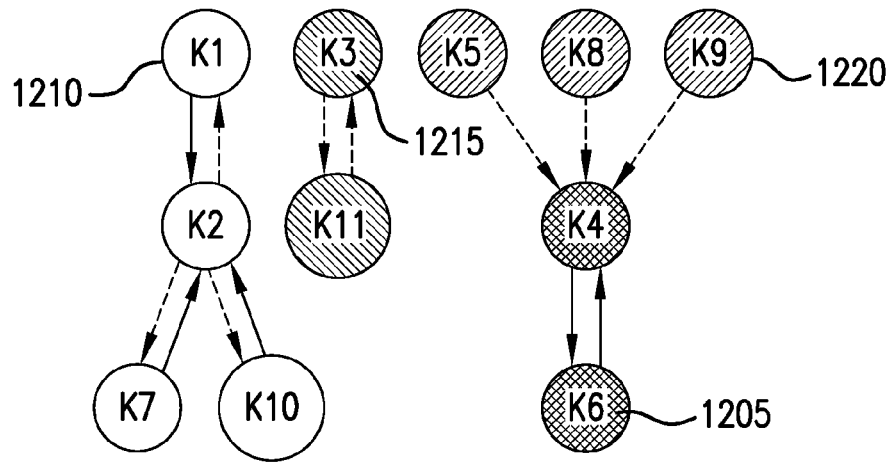
FIGS. 12A and 12B are exemplary diagrams illustrating key interference graphs according to exemplary embodiments of the present disclosure.
Figure 12B:
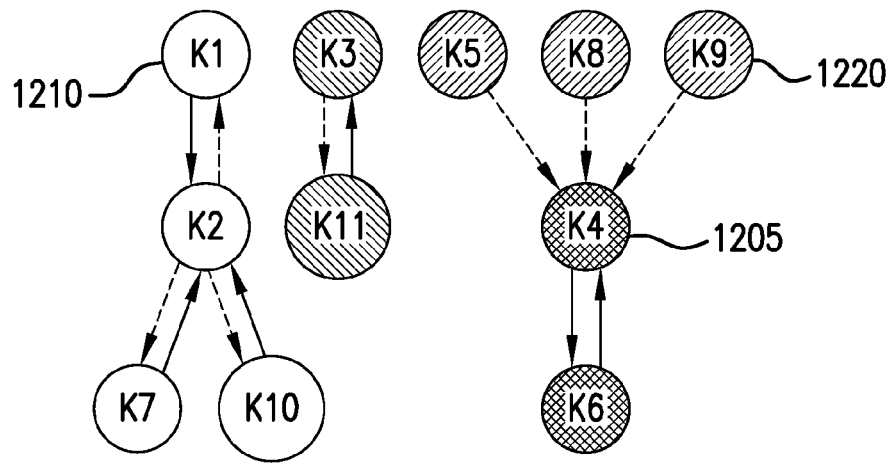

For a random insertion, from a defender's perspective, as shown in exemplary diagrams of FIGS. 12A and 12B, the key interference graph of one of the ISCAS-85 benchmark circuit, C499, can be seen, which can be obfuscated by inserting 11 key-gates. Key-gates K5, K8, and K9 can be classified as dominant key-gates 1220. Key-gates K3 and KII can be classified as consecutively mutable key-gates 1215. Key-gates K1, K2, K7, and K10 can be classified as sequentially mutable key-gates. Key-gates K4 and K6 can be classified as non-mutable key-gates. From a defender's perspective, since there are two non-mutable key-gates, the effective key size can be two.

From an attacker's perspective, an attacker can try to search for the golden pattern for the edge K11→K3 that can simultaneously mute K11 and sensitize K3. The attacker can conclude that such a pattern does not exist. Thus, from an attacker's perspective, the edge from K11→K3 can be non-mutable 1205 as shown in FIG. 12B. Thus, the key-gates K3 and K11 can be classified as sequentially mutable key-gates 1210. For example, as the largest key size on which brute force can be attempted can be two, the effective key size can be two. Even though eleven key-gates are inserted, the effective key size can be only two.

For weighted insertion, from the defender's perspective, as shown in the exemplary diagram of FIG. 12A, the edges K1→K2, K1→K5, K1→K10, and K1→K11 can be mutable. Therefore, the key-gate K1 can be classified as a sequentially mutable key-gate 1210 and all the other gates can be classified as non-mutable key-gates 1205. From a defender's perspective, since there are ten non-mutable key-gates 1205, the effective key size can be ten.

From an attacker's perspective, the attacker can search for the golden pattern that can mute the key-gate K1. As such a pattern may not exist, and the attacker can classify the edges K1→K2, K1→K5, K1→K10, and K1→K11 as non-mutable. Therefore, the key-gate K1 can also become non-mutable. As the attacker can try all combinations of the keys, K1 to K11, the effective key size can be eleven. While the effective key size in random insertion can be two, the exemplary systems, methods and computer-accessible mediums, according to exemplary embodiments of the present disclosure, can have an effective key size of eleven.

Figure 13:
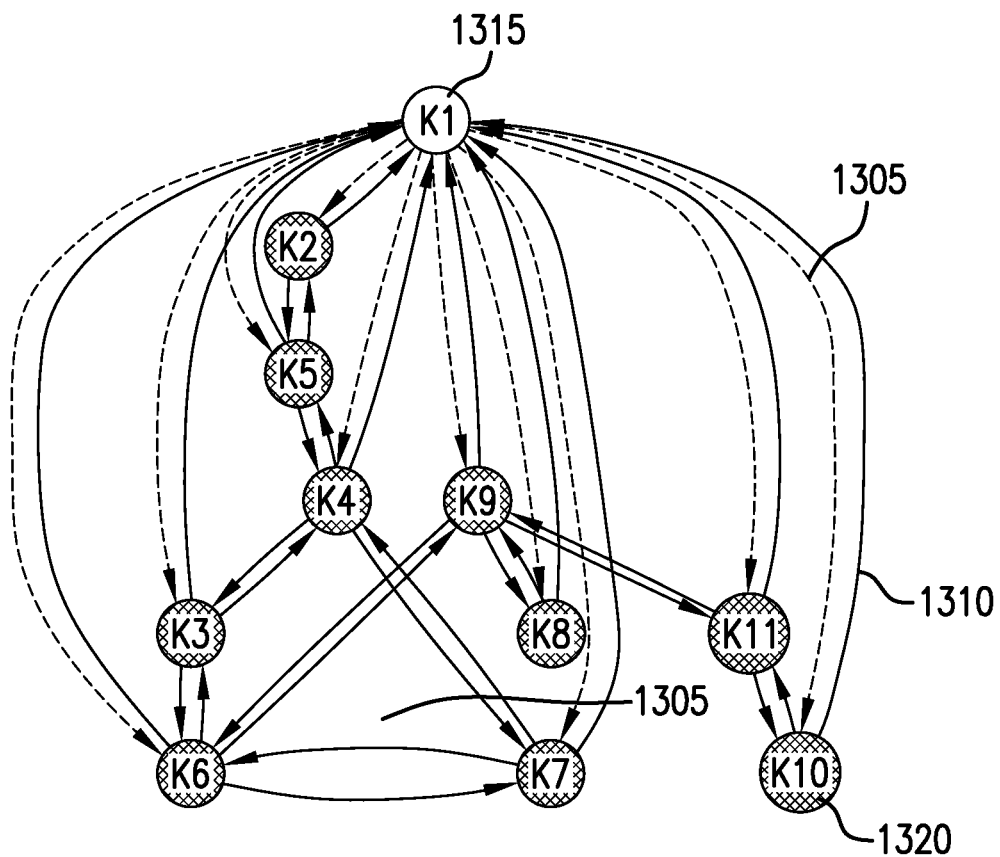
FIG. 13 is an exemplary diagram illustrating further key interference graphs according to exemplary embodiments of the present disclosure.

FIG. 13 shows an exemplary embodiment of a Key-interference graph of C499 from the defender's perspective with an assumption that the edges K1→K2, K1→K5, K1→K10 and K1→K11 are mutable. Dotted lines 1305 can represent mutable edges 1315, and solid lines 1310 can represent non-mutable edges 1320. The exemplary effective key size for the diagram of FIG. 13 can be 10.

Figure 14:
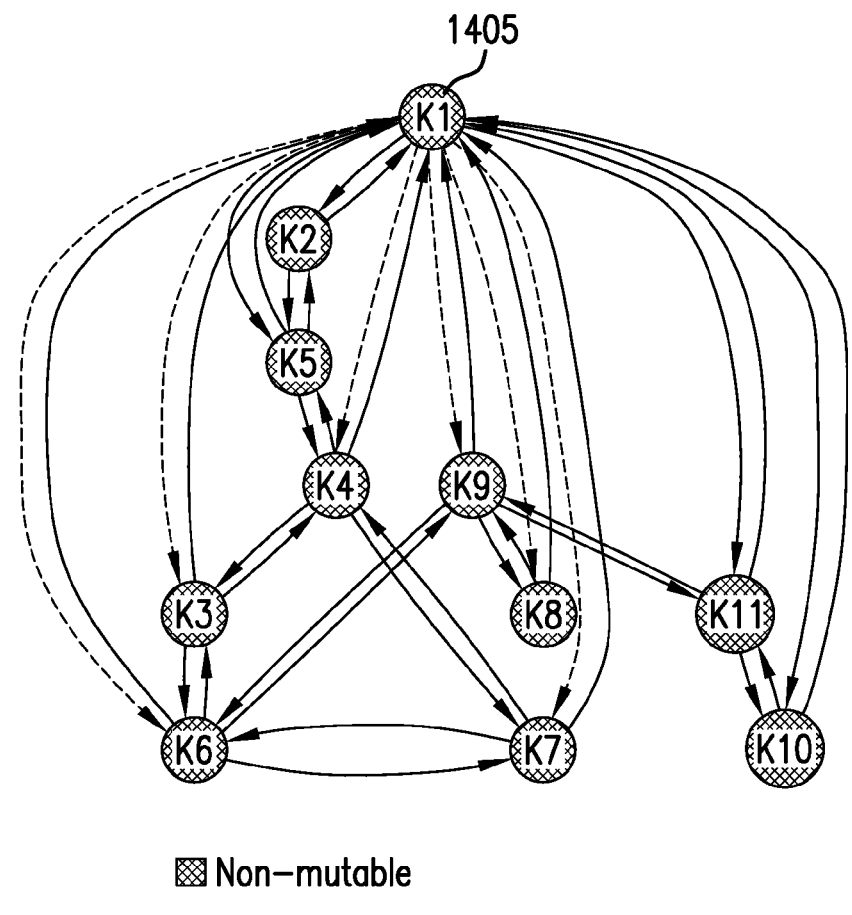
FIG. 14 is an exemplary diagram illustrating exemplary realistic key-interference graphs according to exemplary embodiments of the present disclosure.

FIG. 14 shows an exemplary embodiment of a Realistic Key-interference graph of C499 from the attacker's perspective. For example, the golden patterns to mute the edges K1→K2, K1→K5, K1→10, and K1→K11 may not exist. Thus, as shown in the example of FIG. 14, K1 can be non-mutable increasing 1405 the effective key size to 11.

Exemplary Conclusion

Logic obfuscation can be weak when the inserted key-gates can be isolated, or their effect can be muted. If mutable gates can be employed, then the attacker can determine the key bits within a second. However, it can be strengthened according to exemplary embodiments of the present disclosure, by inserting key-gates such that their effects can be not mutable. In such insertions, when the key size can be greater than 100, it can take several years for an attacker to determine the key bits.

IC testing techniques allow designers and testers to peek into the design, by controlling only the inputs and observing the outputs. On one hand, an attacker can use such capability to subvert logic obfuscation. On the other hand, a defender can perform better logic obfuscation by making such process infeasible using the lessons learnt from testing.

Figure 16:
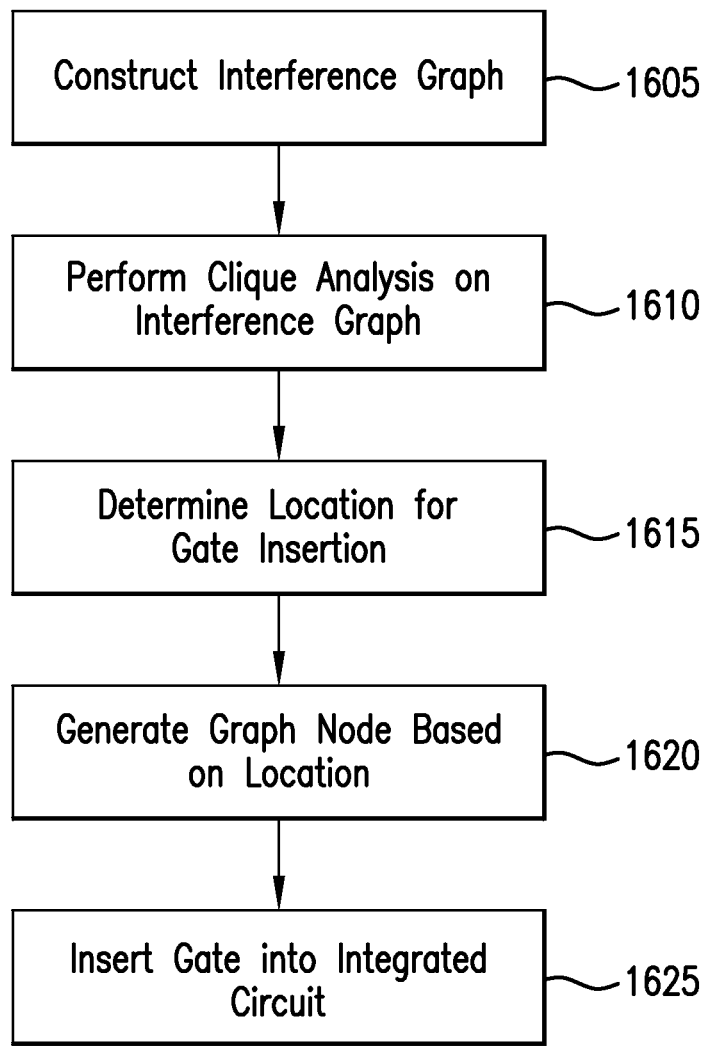
FIG. 16 is an exemplary flow diagram illustrating the insertion of a gate into an Integrated Circuit according to exemplary embodiments of the present disclosure.

FIG. 16 illustrates an exemplary flow diagram of a method for the encryption of an integrated circuit according to an exemplary embodiment of the present disclosure. For example, at procedure 1605, an exemplary interference graph can be constructed, which can be based at least in part on an effect of one location on a further location in the IC. At procedure 1610, an exemplary clique analysis can be performed on the interference graph to determine the location in the IC. Exemplary cliques of the clique analysis can have a specific size to enhance the encryption of the IC. At procedure 1615, a location for gate insertion can be determined. At procedure 1620, an exemplary graph node can be generated related to the location, and at a graph edge related to a degree of erasability of an effect of the location in or on a further location can be determined. A gate can be inserted into the IC at procedure 1625. The gate can include, e.g., a multiplexer, an XOR gate, and/or an XNOR gate, and, e.g., can corrupt the functionality of the IC if an incorrect key is input into the IC.

Figure 15:
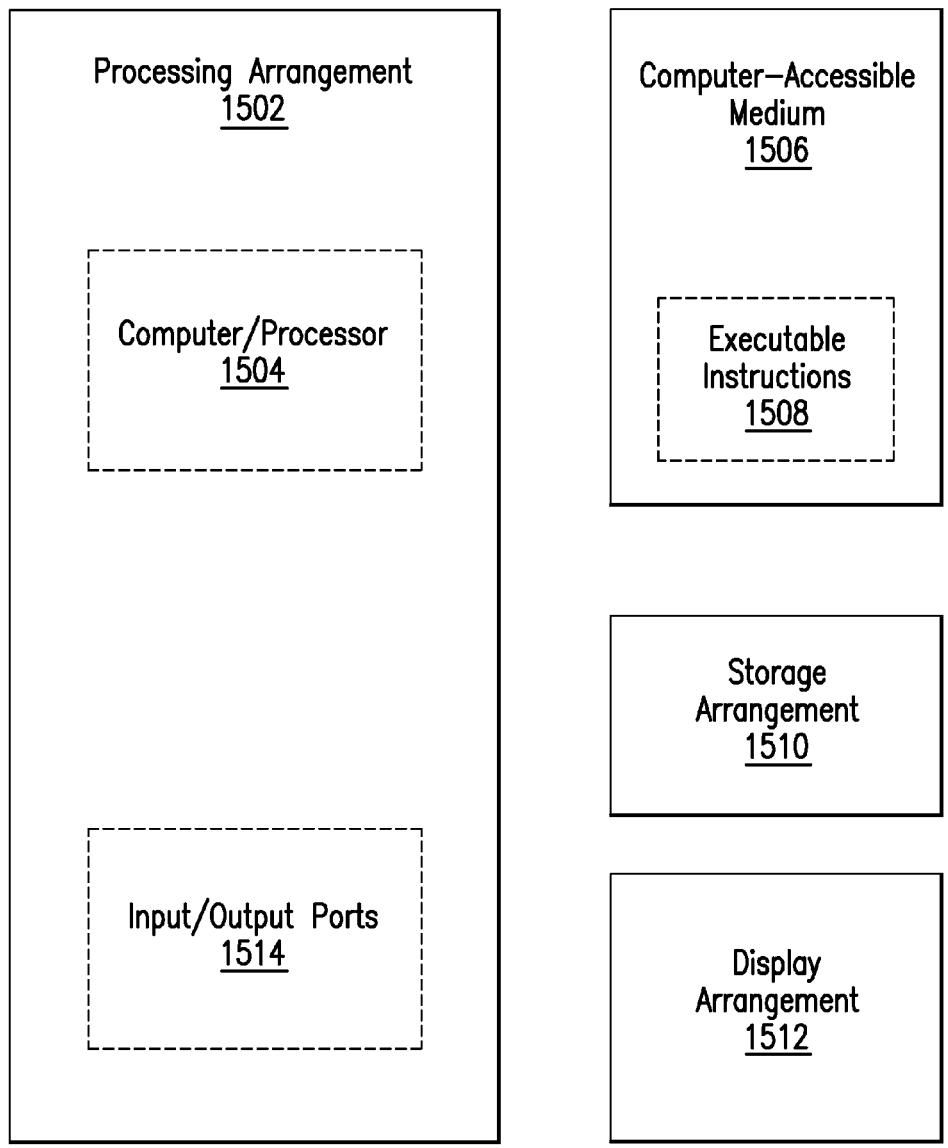
FIG. 15 is a block diagram of an exemplary system in accordance with certain exemplary embodiments of the present disclosure.

FIG. 15 shows a block diagram of an exemplary embodiment of a system according to the present disclosure. For example, exemplary procedures in accordance with the present disclosure described herein can be performed by a processing arrangement and/or a computing arrangement 1502. Such processing/computing arrangement 1502 can be, e.g., entirely or a part of, or include, but not limited to, a computer/processor 1504 that can include, e.g., one or more microprocessors, and use instructions stored on a computer-accessible medium (e.g., RAM, ROM, hard drive, or other storage device).

As shown in FIG. 15, e.g., a computer-accessible medium 1506 (e.g., as described herein above, a storage device such as a hard disk, floppy disk, memory stick, CD-ROM, RAM, ROM, etc., or a collection thereof) can be provided (e.g., in communication with the processing arrangement 1502). The computer-accessible medium 1506 can contain executable instructions 1508 thereon. In addition or alternatively, a storage arrangement 1510 can be provided separately from the computer-accessible medium 1506, which can provide the instructions to the processing arrangement 1502 so as to configure the processing arrangement to execute certain exemplary procedures, processes, and methods, as described herein above, for example.

Further, the exemplary processing arrangement 1502 can be provided with or include an input/output arrangement 1514, which can include, e.g., a wired network, a wireless network, the internet, an intranet, a data collection probe, a sensor, etc. As shown in FIG. 15, the exemplary processing arrangement 1502 can be in communication with an exemplary display arrangement 1512, which, according to certain exemplary embodiments of the present disclosure, can be a touch-screen configured for inputting information to the processing arrangement in addition to outputting information from the processing arrangement, for example. Further, the exemplary display 1512 and/or a storage arrangement 1510 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.
[1] J. Roy, F. Koushanfar, and I. Markov, "EPIC: Ending Piracy of Integrated Circuits," 5 Proc. of Design, Automation and Test in Europe, pp. 1069-1074, 2008.
[2] "Defense Science Board (DSB) study on High Performance Microchip Supply," http://www.acg.osd.mil/dsb/reports/ADA435563.pdf, 2005.
[3] R. Karri, J. Rajendran, K. Rosenfeld, and M. Tehranipoor, "Trustworthy Hardware: Identifying and Classifying Hardware Trojans," IEEE Computer, vol. 43, no. 10, pp. 39-46, 2010.
[4] SEMI, "Innovation is at risk as semiconductor equipment and materials industry loses up to $4 billion annually due to IP infringement," www.semi.org/en/Press/P043775, 2008.
[5] M. L. Bushnell and V. D. Agrawal, "Essentials of Electronic Testing for Digital, Memory, and Mixed-Signal VLSI Circuits," Kluwer Academic Publishers, Boston, 2000.
[6] H. Lee and D. Ha, "An efficient forward fault simulation algorithm based on the parallel pattern single fault propagation," Proc. of IEEE International Test Conference, pp. 946-955, 1991.
[7] R. Chakraborty and S. Bhunia, "HARPOON: An Obfuscation-Based SoC Design Methodology for Hardware Protection," IEEE Transactions on Computer-Aided Design, vol. 28, no. 10, pp. 1493-1502, 2009.
[8] A. Baumgarten, A. Tyagi, and J. Zambreno, "Preventing IC Piracy Using Reconfigurable Logic Barriers," IEEE Design and Test of Computers, vol. 27, no. 1 pp. 66-75, 2010.

What is claimed is:

1. A non-transitory computer-accessible medium having stored thereon computer-executable instructions for encrypting at least one integrated circuit ("IC"), wherein, when a computer hardware arrangement executes the instructions, the computer arrangement is configured to perform procedures comprising: determining, using an analysis of a pairwise security of a plurality of key-gates, at least one particular key-gate of the plurality of key-gates to insert into least one combinational portion of the at least one IC;
  inserting the at least one key-gate into the at least one combinational portion of the at least one IC in the at least one location;
  wherein the at least one key-gate is configured to receive at least one input from a key stored in a secure memory; and wherein the computer arrangement is configured to perform the analysis based on a determination of whether the at least one particular key-gate is unsensitized to at least one of (i) at least one primary output of the at least one IC or (ii) at least one pseudo-primary output of the at least one IC.

2. The computer-accessible medium of claim 1, wherein the computer arrangement is configured to determine the at least one particular key-gate using an iterative procedure.

3. The computer-accessible medium of claim 1, wherein the computer arrangement is configured to determine the at least one particular key-gate based on a determination of whether the at least one particular key-gate is pairwise secure with all previously-determined key-gates in the at least one IC.

4. The computer-accessible medium of claim 1, wherein the computer arrangement is further configured to determine at least one further key-gate of the plurality of key-gate to insert into the at least one IC based on determination of whether the at least one further key-gate is pairwise secure with all previously determined key-gate in the at least one IC.

5. The computer-accessible medium of claim 1, wherein the computer arrangement is configured determine whether the at least one particular key-gate is unsensitized to the at least one of (i) the at least one primary output of the at least one 1C or (ii) the at least one pseudo-primary output of the at least one 1C based on an initialization of the at least one further key-gate to a particular value.

6. The computer-accessible medium of claim 1, wherein the at least one key-gate is at least one of an XOR gate or an XNOR gate.

7. A method for encrypting at least one integrated circuit (IC) comprising: determining, using an analysis of a pairwise security of a plurality of key-gates, at least one particular key-gate of the plurality of key-gates to insert into at least one combinational portion of the at least one IC; using a computer hardware arrangement, inserting the at least one particular key-gate into the at least one combinational portion of the at least one IC in the at least one location;
receiving, with the at least one key-gate, at least one input from a key stored in a secure memory; and
performing the analysis, using the computer arrangement, based on a determination of whether the at least one particular key-gate is unsensitized to at least one of (i) at least one primary output of the at least one IC or (ii) at least one pseudo-primary output of the at least one IC.

8. The method of claim 7, further comprising determining, using the computer hardware arrangement, the at least one particular key-gate using an iterative procedure.

9. The method of claim 7, further comprising determining, using the computer hardware arrangement, the at least one particular key-gate based on a determination of whether the at least one particular key-pate is pairwise secure with all previously-determined key-gates in the at least one IC.

10. The method of claim 7, wherein the at least one gate is at least one of an XOR gate or an XNOR gate.

11. The method of claim 7, further comprising, determining, using the computer arrangement, whether the at least one particular key-gate is unsensitized to the at least one of (i) the at least one primary output of the at least one 1C or (ii) the at least one pseudo-primary output of the at least one 1C based on an initialization of the at least one further key-gate to a particular value.

12. An encrypted circuit comprising: at least one key-gate which is provided in at least one combinational portion of the encrypted circuit, wherein a placement of the at least one key-gate is determined using an analysis of a pairwise security of a plurality of key-gates,
wherein the at least one key-gate is configured to receive at least one of its inputs from a key stored in a secure memory; and
wherein the analysis is based on a determination of whether the at least one particular key-gate is unsensitized to at least one of (i) at least one primary output of the at least one IC or (ii) at least one pseudo-primary output of the at least one IC.

13. The encrypted circuit of claim 12, wherein the at least one key-gate includes at least one of an XOR gate or an XNOR gate.

14. The encrypted circuit of claim 12, wherein the at least one key-gate is determined based on a determination of whether the at least one key-gate is pairwise secure with all previously-determined key-gates in the encrypted circuit.

* * * * *